(12) United States Patent
Kimura

(10) Patent No.: US 8,005,306 B2
(45) Date of Patent: Aug. 23, 2011

(54) DECODING APPARATUS, INVERSE QUANTIZATION METHOD, AND COMPUTER READABLE MEDIUM

(75) Inventor: Shunichi Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 896 days.

(21) Appl. No.: 11/500,946

(22) Filed: Aug. 9, 2006

(65) Prior Publication Data

US 2007/0116371 A1 May 24, 2007

(30) Foreign Application Priority Data

Nov. 18, 2005 (JP) .................... 2005-334086

(51) Int. Cl.
*G06K 9/36* (2006.01)

(52) U.S. Cl. .......... 382/233; 382/251; 375/240.03; 375/240.22; 704/230; 704/256.7

(58) Field of Classification Search ............. 382/251
See application file for complete search history.

(56) References Cited

U.S. PATENT DOCUMENTS

| | | | |
|---|---|---|---|
| 5,778,102 A * | 7/1998 | Sandford et al. ............. 382/251 |
| 5,933,194 A | 8/1999 | Kim et al. |
| 6,301,368 B1 * | 10/2001 | Bolle et al. ................... 382/100 |
| 6,351,568 B1 * | 2/2002 | Andrew ......................... 382/239 |
| 6,778,709 B1 * | 8/2004 | Taubman ....................... 382/240 |
| 6,996,282 B1 * | 2/2006 | Kondo et al. ................. 382/239 |
| 7,181,071 B2 * | 2/2007 | Kim et al. ..................... 382/236 |
| 2002/0009209 A1 * | 1/2002 | Inoue et al. ................... 382/100 |
| 2003/0215111 A1 * | 11/2003 | Zhang et al. .................. 382/100 |
| 2006/0013481 A1 * | 1/2006 | Park et al. ..................... 382/170 |
| 2006/0133686 A1 * | 6/2006 | Gomila et al. ................ 382/254 |
| 2006/0210183 A1 | 9/2006 | Kimura |

FOREIGN PATENT DOCUMENTS

| | | |
|---|---|---|
| JP | A-8-18961 | 1/1996 |
| JP | A-9-200760 | 7/1997 |
| JP | A-2000-137820 | 5/2000 |
| JP | A-2001-136526 | 5/2001 |

OTHER PUBLICATIONS

Marcellin et al., "An Overview of Quantization in JPEG 2000," 2002, Singal Processing:Image Communication 17, pp. 73-84.*
Taubman et al., "JPEG 2000: image compression fundamentals, standards and practice," 2002, Kluwer Academic Publisher, p. 14 and 99-100.*
Heeger, D., et al.; "Pyramid based texture analysis/synthesis," *Computer Graphics*, pp. 229-238, SIGGRAPH 95, 1995. ITU Recommendation T.800; "Series T: Terminals for Telematic Services/Information technology—JPEG 2000 Image Coding System: Core Coding System," *International Telecommunication Union*, pp. 1-212, Aug. 2002.
Non-published U.S. Appl. No. 11/172,967, filed Jul. 5, 2005 in the name of Shunichi Kimura.
Japanese Patent Office, Notification of Reason for Refusal for Japanese Patent Application No. 2005-334086 (with English translation), Mar. 30, 2011, pp. 1-5 (pp. 1-16 for translation).

* cited by examiner

*Primary Examiner* — John Lee
(74) *Attorney, Agent, or Firm* — Oliff & Berridge PLC

(57) ABSTRACT

A decoding apparatus includes a classification section, a distribution-information generation section and an inverse-quantization-value generation section. The classification section classifies quantization indices contained in input code data into a plurality of groups. The distribution-information generation section generates distribution information of the quantization indices for each group, based on the quantization indices classified by the classification section. The inverse-quantization-value generation section generates inverse quantization values, which correspond to the respective quantization indices, based on the distribution information generated by the distribution-information generation section.

4 Claims, 13 Drawing Sheets

CODING PROCESSING

DECODING PROCESSING

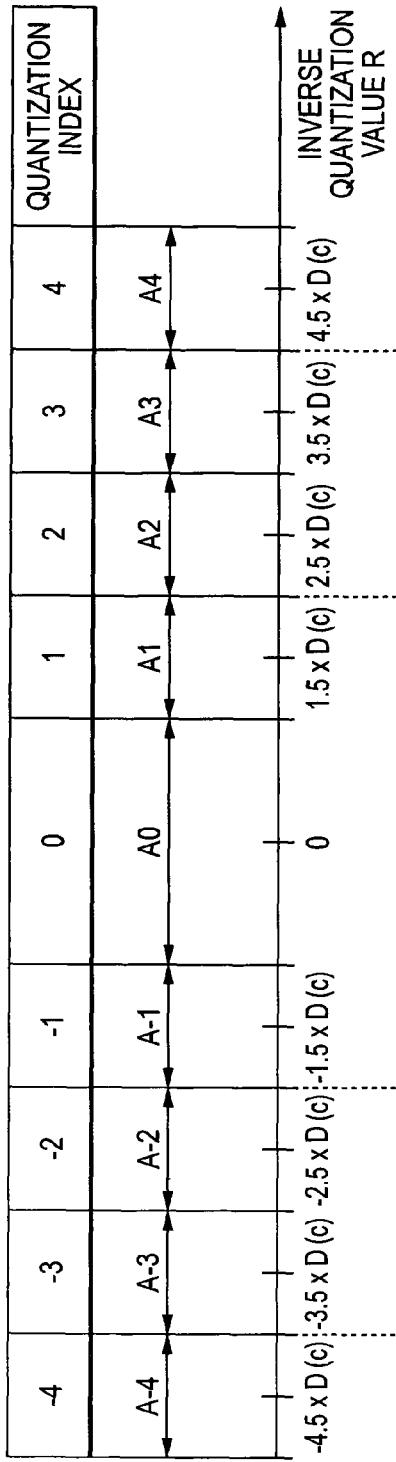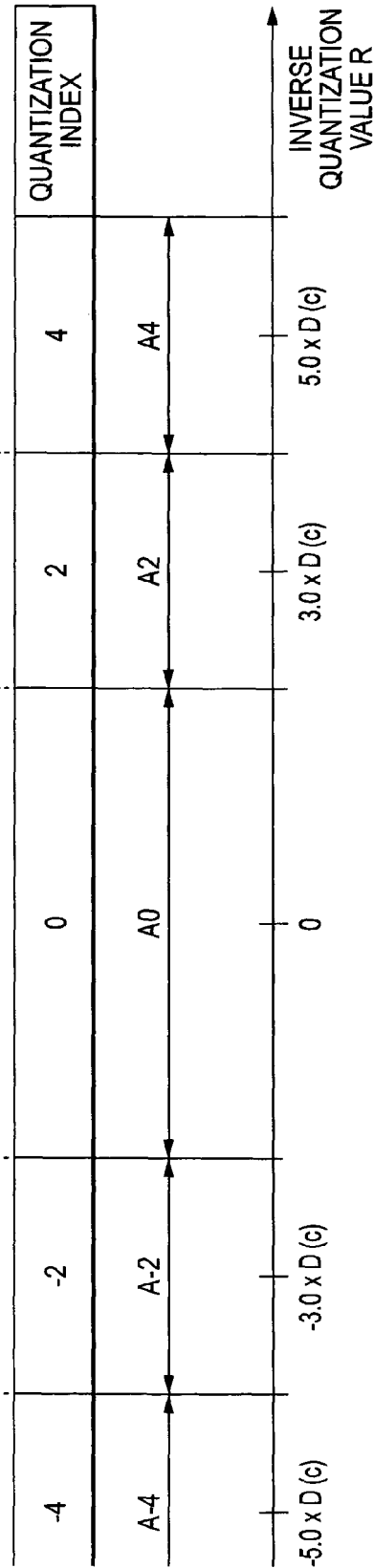

$$\begin{cases} Z = \sum_{x=m}^{m+n} r(x) \times h_1(x) \\ \\ h(x) = r(x) \times \{h_2(K) * h_1(x)/Z + h_1(x)\} \end{cases}$$

DECODING APPARATUS, INVERSE QUANTIZATION METHOD, AND COMPUTER READABLE MEDIUM

BACKGROUND

1. Technical Field

The invention relates to a decoding apparatus for decoding code data generated by performing coding processing. In particular, the invention relates to a decoding apparatus for inverse-quantizing code data generated by performing coding processing, which involves quantization of data, to thereby decode the code data.

2. Related Art

For example, ITU-T Recommendation T.800 discloses JPEG 2000 standard.

SUMMARY

According to an aspect of the invention, a decoding apparatus includes a classification section, a distribution-information generation section and an inverse-quantization-value generation section. The classification section classifies quantization indices contained in input code data into a plurality of groups. The distribution-information generation section generates distribution information of the quantization indices for each group, based on the quantization indices classified by the classification section. The inverse-quantization-value generation section generates inverse quantization values, which correspond to the respective quantization indices, based on the distribution information generated by the distribution-information generation section.

BRIEF DESCRIPTION OF THE DRAWINGS

Exemplary embodiments of the invention will be described in detail based on the following figures, wherein:

FIG. 3 is a drawing to illustrate quantization intervals when truncation positions differ; FIG. 3A illustrates the quantization intervals when all bits including the least significant bit exist and FIG. 3B illustrates the quantization intervals when only the least significant bit is excluded;

DETAILED DESCRIPTION

Since a data amount of image data and a data amount of audio data are enormous, it is a common practice to compress the image data and the audio data, to reduce the data amounts and then to retain and/or transmit the data. For example, multilevel image data generated in the case where a color original or photo is electronized with an image scanner or multilevel image data generated in the case where a photo of a landscape is taken with a digital camera is compressed according to a lossy coding system of JPEG 2000 or the like. Thereby, the data amount can be lessened.

If the lossy coding is executed, coding distortion may occur.

Then, a mechanism of generating the coding distortion in the lossy coding will be discussed.

Figure 1A:
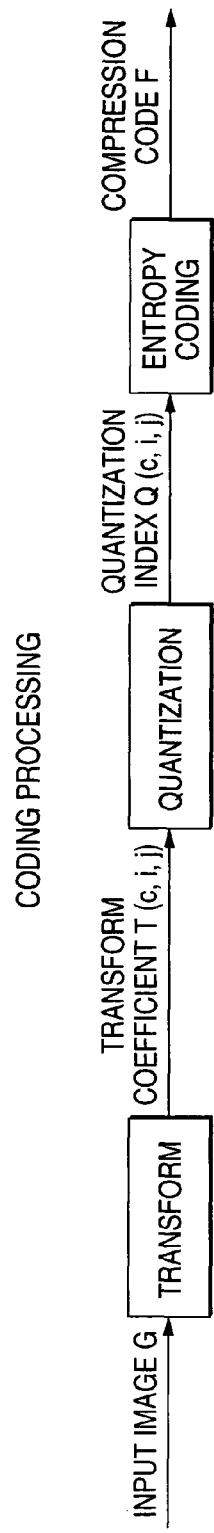
FIG. 1 is a drawing to describe an outline of a transform coding system such as JPEG 2000.
Figure 1B:
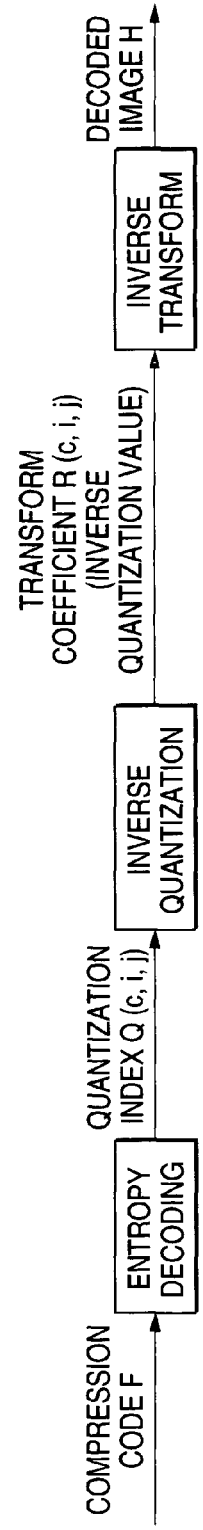

FIGS. 1A and 1B are drawings to describe an outline of a transform coding system such as JPEG 2000. FIG. 1A shows an outline of coding processing. FIG. 1B shows an outline of decoding processing.

Figure 2A:
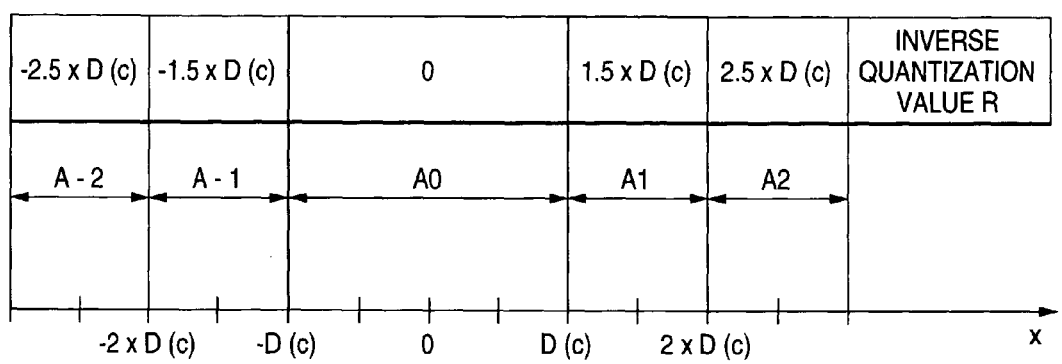
FIG. 2 is a drawing to describe quantization processing in the transform coding system.
Figure 2B:
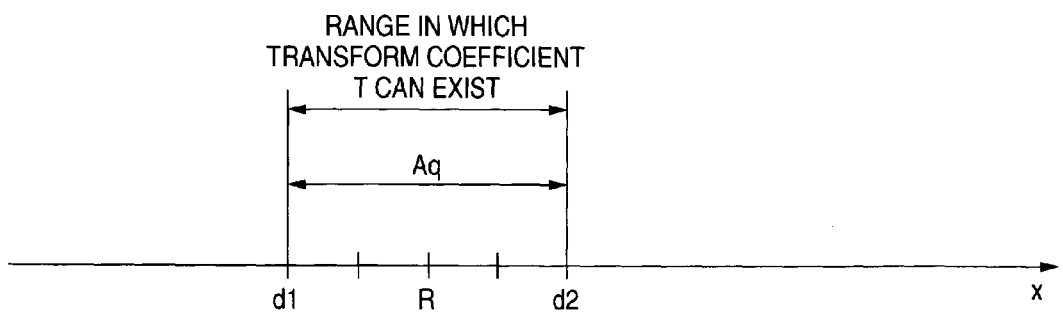

FIGS. 2A and 2B are drawings to describe quantization processing in the transform coding system. A transform coefficient $T(c, i, j)$ and a quantization index $Q(c, i, j)$ shown in FIG. 1 are functions of variables c, i, and j. The variable c is an index indicating a type of transform coefficient. For example, in the case of using the wavelet transform, the variable c indicates any of a 1HH component, a 1LH component, a 1HL component, a 2HH component, a 2LH component, a 2HL component, . . . , an NLL component. The variables i and j indicate a position of each transform coefficient. For example, in the case of using the wavelet transform, ith and jth data from the top and from the left, of the cth transform coefficient is represented as $T(c, i, j)$.

As shown in FIG. 1A, in the coding processing of the transform coding system, transform processing such as wavelet transform is performed for an input image G to generate a transform coefficient T of the input image G. Then, the transform coefficient T is further quantized into a quantization index Q. Entropy coding (lossless coding) is performed for the quantization index Q to generate a compression code F.

The quantization index is information to identify a quantization value. The quantization value is a degeneracy value of a group of numeral values, which are in a given range (quantization section). The quantization values are discrete values representing quantization sections "A-2" to "A2" (in this example, "$-2.5 \times D(c)$" to "$2.5 \times D(c)$") as illustrated in FIG. 2.

The entropy coding is performed for the code data (compression code F) thus generated to generate a quantization index Q. This quantization index Q is the same as the quantization index Q at the coding time.

Further, the quantization index Q is inversely quantized into a transform coefficient (namely, inverse quantization value) R. Then, the transform coefficient R is inversely transformed to generate a decoded image H.

The inverse quantization value is generated based on the quantization index or the quantization value. The inverse quantization value is used in decoding code data. For example, the inverse quantization is a transform coefficient of JPEG 2000 (transform coefficient associated with quantization index).

In the described process, coding distortion may occur when the quantization is executed. Making a comparison between precision of transform coefficients T of original image and that of quantization indices Q, generally the precision of the transform coefficients T is higher than that of the quantization indices Q. Thus, transform coefficients R, which are reproduced using the quantization indices Q, become different from the original transform coefficients T. This is the cause of the coding distortion.

Next, quantization and inverse quantization will be discussed in more detail with reference to FIG. 2.

The quantization is executed using a quantization step width D(c) provided for each transform coefficient c. The quantization step width D is a function of the transform coefficient type c. For example, in JPEG 2000, the quantization index Q and the inverse quantization value R are calculated according to the following expressions:

$$Q(c,i,j)=\text{sign}(T(c,i,j))\times\text{floor}(|T(c,i,j)|/D(c))$$

if Q(c, i, j)>0, $$R(c,i,j)=(Q(c,i,j)+r)\times D(c)$$

if Q(c, i, j)<0, $$R(c,i,j)=(Q(c,i,j)-r)\times D(c)$$

if Q(c, i, j)=0, $$R(c,i,j)=0$$

where sign ( ) is a function to return a positive or negative sign, floor is a function to set the decimal places to 0, and | | is a sign indicating the absolute value.

Also, r is a numeric value in a range of from 0 to 1. FIG. 2 illustrates the typical case where value r=0.5.

Although lower bits may not be coded in JPEG 2000, the case where all bits including the least significant bit are coded will be discussed as a specific example in FIG. 2.

As shown in FIG. 2A, in coding processing of JPEG 2000, the transform coefficients T (before quantization) generated by performing transform processing for the input image G distribute on a number line x axis.

If the transform coefficient T exists in a quantization section A0, the quantization index Q obtained by the quantization processing is 0. Likewise, if the transform coefficient T exists in a quantization section Aq, the quantization index Q becomes q.

If the quantization index Q is 0, an inverse quantization value R=0 is generated by the inverse quantization processing. If the quantization index Q is 1, an inverse quantization value R=1.5×D(c) is generated by the inverse quantization processing.

Thus, when the inverse quantization processing is performed, the inverse quantization values are generated in a one-to-one correspondence with the quantization indices Q.

To simplify the issue, discussion will be made on the inside of the quantization section Aq where the quantization index Q becomes q.

It is assumed that the transform coefficient T exists in the quantization section Aq.

As illustrated in FIG. 2B, it is assumed that the quantization section Aq is in a range of from d1 to d2. At this time, the original transform coefficient T is contained in the range of d1 to d2. Also, it is assumed that the inverse quantization value of the transform coefficient T is R.

Under these circumstances, the transform coefficient to generate a decoded image is the inverse quantization value R. However, the transform coefficient T of the original image is any value in the range of d1 to d2 and is not always the inverse quantization value R. At this time, there is a difference between the original transform coefficient T and the inverse quantization value R. This difference causes coding distortion to occur.

Thus, in the lossy coding system, a plurality of data values (original data values existing in each quantization section) are made to degenerate into one quantization value (quantization value corresponding to each quantization section). Thereby, lossy data compression is realized. At the same time, however, the quantization causes coding distortion to occur.

In order to lessen such coding distortion, such a parameter degrading the compression efficiency at the coding time may be selected.

In this case, however, the coding efficiency may be lowered and an amount of the resultant data may increase.

In the case of converting already coded data into high image quality, the system of degrading the compression efficiency cannot be adopted.

Then, a decoding apparatus 2 according to an exemplary embodiment of the invention brings the frequency distribution of the inverse quantization values R to be close to the frequency distribution of the transform coefficients T of an input image as much as possible, to thereby generate a decoded image close to the input image as much as possible.

That is, in the standard technology of JPEG 2000, the frequency distribution of the inverse quantization values is only at one point of the value R. However, the frequency distribution of the inverse quantization values is brought to be close to the frequency distribution of the transform coefficients T of the original image, to thereby achieve better decoding.

Because, it is considered that a decoded image close to the original image in frequency distribution is closer to the original image than a decoded image, which is different from the original image in frequency distribution although the original image and the decode image are not always identical to each other match when the frequency distributions of them are identical to each other. In fact, a document ("Pyramid based texture analysis/synthesis," D. Heeger and J. Bergen, Computer Graphics, pp. 229-238, SIGGRAPH 95, 1995) describes a technique of synthesizing images having similar textures by bringing the frequency distributions of the transform coefficients to be identical to each other.

The decoding apparatus 2 according to the exemplary embodiment generates a decoded image close to an original image in frequency distribution, to thereby generate a decoded image having a texture closer to the original image.

For example, the inverse quantization values close to the frequency distribution of the original transform coefficients may be generated using any of the following three methods:

In the first method, the decoding apparatus 2 estimates frequency distribution of transform coefficients based on frequency distribution of quantization indices (or inverse quantization values, which are in a one-to-one correspondence with the quantization indices) and corrects the inverse quantization values corresponding to the quantization indices based on the estimated frequency distribution.

Since it is considered that the frequency distribution of the quantization indices (or the inverse quantization values, which are in a one-to-one correspondence with the quantization indices) is similar to that of the original transform coefficients T, the frequency distribution of the quantization indices (or the inverse quantization values, which are in a one-to-one correspondence with the quantization indices) and the frequency distribution of the inverse quantization values generated in accordance with the quantization index values are matched with each other as much as possible. Thereby, decoded data having higher reproducibility can be obtained.

In the second method, the decoding apparatus 2 estimates frequency distribution of transform coefficients based on frequency distribution of quantization indices (or inverse quantization values, which are in a one-to-one correspondence with the quantization indices), generates random numbers corresponding to the estimated frequency distribution, and generates inverse quantization values corresponding to the quantization indices using the generated random numbers.

Also, in this case, the frequency distribution of the quantization indices (or the inverse quantization values, which are in a one-to-one correspondence with the quantization indices) and the frequency distribution of the inverse quantization values generated in accordance with the quantization index values can be matched with each other as much as possible.

In the third method, the decoding apparatus 2 references surrounding quantization indices (or inverse quantization values, which are in a one-to-one correspondence with the surrounding quantization indices) and corrects the inverse quantization values corresponding to the quantization indices to be processed.

Since a high correlation is found between the quantization indices adjacent to each other, the surrounding quantization indices are referenced and the inverse quantization value corresponding to the quantization index in question is corrected. Thereby, decoded data having higher reproducibility can be obtained.

Thus, since at least one of the three methods described above is applied, it is made possible to generate decoded data having higher reproducibility.

The example shown in FIG. 2 corresponds to the case where all bits including the least significant bit are coded. However, the lower bits may not be coded. If lower bits are not coded or if code corresponding to lower bits is discarded (which will be hereinafter collectively called "truncation"), substantial quantization intervals become different.

FIG. 3 is a drawing to illustrate the quantization intervals when the truncation positions differ. FIG. 3A illustrates the quantization intervals when all bits including the least significant bit exist. FIG. 3B illustrates the quantization intervals when only the least significant bit is excluded.

As illustrated in FIG. 3, if the bit truncation positions differ, the substantial quantization intervals differ.

Thus, since the lower bit may be truncated, it should be noted that the quantization intervals corresponding to the quantization indices may differ in the case of estimating the frequency distribution of the transform coefficients (the first method and the second method) or in the case of referring to the quantization indices of the surrounding pixels (the third method).

Then, the decoding apparatus 2 according to the exemplary embodiment classifies quantization indices into groups based on information concerning truncation positions, generates frequency distribution of the quantization indices for each group, and estimates frequency distribution of transform coefficients based on the generated frequency distribution of the quantization indices.

[Processing Responsive to Truncation Position]

Next, processing responsive to the truncation positions will be discussed more specifically.

The exemplary embodiment contains an element 1 in which processings are performed for respective code blocks independently, an element 2 in which frequency distributions, which are different in a truncation position, are combined, and an element 3 in which quantization indices of surrounding pixels are evaluated appropriately and preliminary inverse quantization value of a pixel in question is calculated. The elements 1 to 3 may be adopted singly or in combination.

First, the element 1 will be discussed.

In code data of JPEG 2000, quantization intervals of transform coefficients of the same type in the same code block closely resemble. Specifically, a difference in a truncation position would be at most one bit in the same code block.

Then, the decoding apparatus 2 of the exemplary embodiment performs processings for respective code blocks independently. Specifically, the decoding apparatus 2 generates frequency distribution of quantization indices for each code block. Inverse quantization values corresponding to the quantization indices may be calculated for the respective code blocks.

Thus, if processings are performed for the respective code blocks independently, number of kinds of number of truncated lower bits S becomes equal to at most two. Therefore, integration processing of frequency distributions (described later) is facilitated.

Decoding processing of JPEG 2000 is performed for each code block and thus, is convenient from the viewpoints of the memory efficiency, the decoding processing speed, and the ease of implementation. Particularly, the frequency distribution (histogram) may be created for each code block. Thus, the histogram of the whole code need not be generated.

Since statistics (frequency distribution) are calculated for each code block, local change in nature of an image can be followed.

In the exemplary embodiment, if quantization indices different in truncation position are mixed in a code block (specifically, two kinds), the frequency distributions of the quantization indices are integrated according to the element 2. However, the invention is not limited to it. For example, the larger quantization interval of the two kinds of quantization intervals may be adopted. More specifically, if the numbers of truncated bits are $S_1$ and $S_2$ ($S_1 < S_2$), all quantization indices are shifted to the right by $S_2$ bits for unifying the quantization intervals of all quantization indices to generate a frequency distribution.

Next, the element 2 will be discussed.

If quantization intervals of quantization indices are different, it is impossible to simply count occurrence frequency of the quantization indices to create a frequency distribution. If the quantization intervals are artificially unified as described above, precision of the frequency distribution is degraded.

Then, the decoding apparatus 2 according to the exemplary embodiment classifies the quantization indices into groups based on truncation positions of the quantization indices (or quantization intervals), generates frequency distribution of the quantization indices for each group, and integrates the generated frequency distributions.

In this example, processings are performed for respective code blocks independently and thus, number of the kinds of number of truncated bits becomes two ($S_1$ and $S_2$). Then, the decoding apparatus 2 classifies the quantization indices contained in code block into two groups based on the kinds of number of truncated bits (namely, the kinds of number of significant bits) and generates a histogram $h_1$ corresponding to the number of truncated bits $S_1$ and a histogram $h_2$ corresponding to the number of truncated bits $S_2$. Next, the decoding apparatus 2 integrates the histogram $h_1$ and the histogram $h_2$ based on the narrower quantization interval to generate an integrated histogram h. Specifically, the decoding apparatus 2 distributes the frequency values of the histogram with the larger quantization intervals to the quantization sections of the histogram with the smaller quantization intervals. The decoding apparatus 2 distributes the frequency values having larger quantization intervals in accordance with a ratio of the frequency values of the histogram to which the frequency values having larger quantization intervals are distributed. If the frequency values of the histogram to which the frequency values having larger quantization intervals are distributed are 0, the decoding apparatus 2 distributes the frequency values having the larger quantization intervals, in accordance with a ratio corresponding to a width of the quantization sections to which the frequency values are distributed.

Next, the element 3 will be discussed.

In the third method, it is necessary to calculate a difference between inverse quantization value corresponding to a quantization index in question and an inverse quantization value corresponding to a quantization index in the surrounding of the quantization index in question.

However, as illustrated in FIG. 3, if the truncation positions are different, the inverse quantization values corresponding to the same quantization index become different. For example, a standard inverse quantization value R corresponding to a quantization index "2" in FIG. 3A is 2.5×D(c). On the other hand, an inverse quantization value R corresponding to the quantization index "2" in FIG. 3B is 3.0×D(c).

Then, the decoding apparatus 2 according to the exemplary embodiment refers to the inverse quantization value corresponding to the surrounding quantization index to calculate the inverse quantization value corresponding to the quantization index in question rather than refers to the surrounding quantization index to calculate the inverse quantization value corresponding to the quantization index in question.

Exemplary Embodiment

The exemplary embodiment of the invention will be discussed below.

In the exemplary embodiment, the case where code data coded according to JPEG 2000 is decoded will be discussed as a specific example. The decoding processing described in the exemplary embodiment is roughly similar to that described in ITU-T Recommendation T.800. The decoding processing according to the exemplary embodiment is different from that according to ITU-T Recommendation T.800 in that inverse quantization processing according to the exemplary embodiment is used.

[Hardware Configuration]

To begin with, the hardware configuration of the decoding apparatus 2 in the exemplary embodiment will be discussed.

Figure 4:
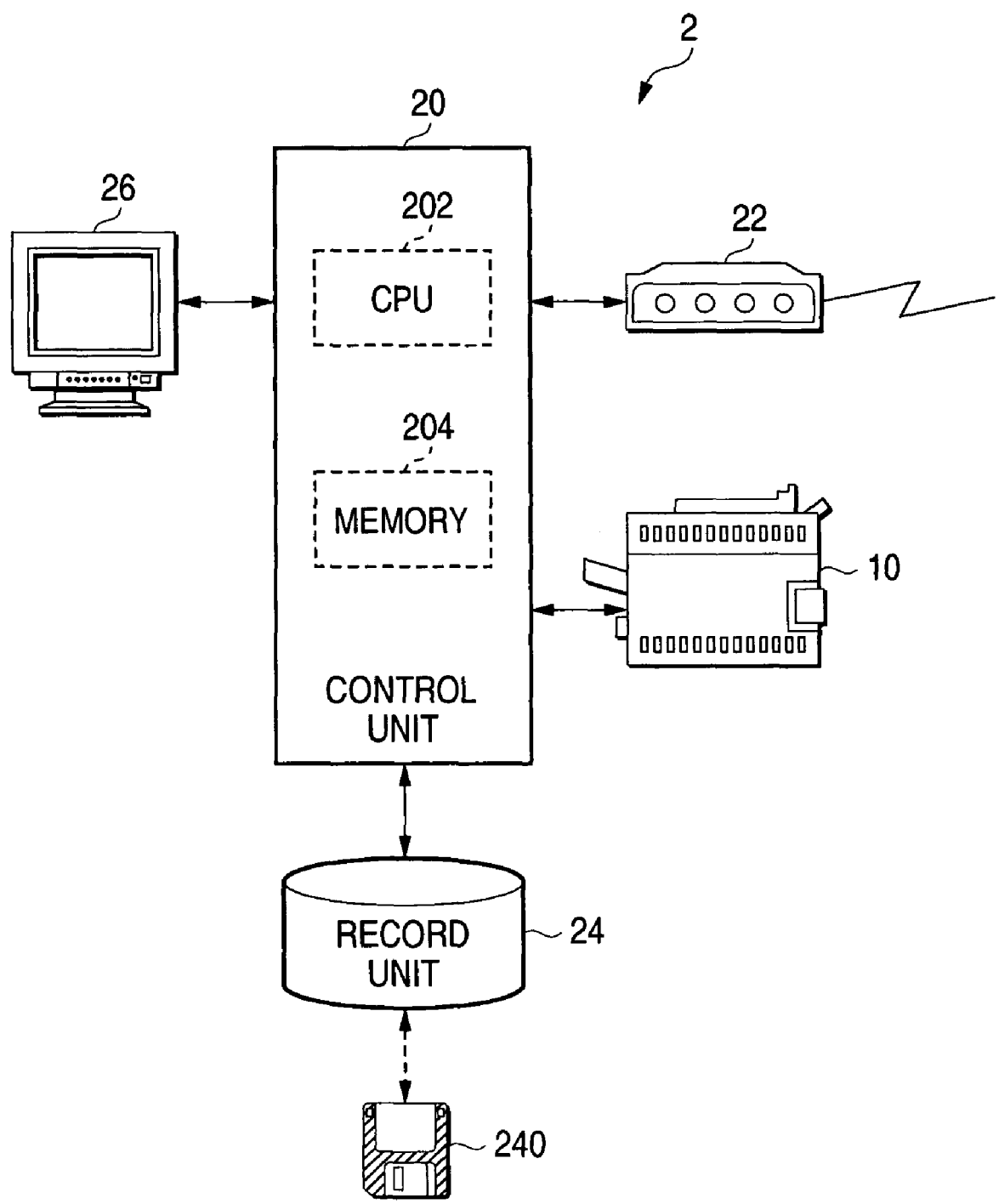
FIG. 4 is a drawing to illustrate the hardware configuration of a decoding apparatus 2 incorporating an inverse quantization method according to an exemplary embodiment of the invention, centering on a control apparatus 20.

FIG. 4 is a drawing to illustrate the hardware configuration of the decoding apparatus 2 incorporating an inverse quantization method according to the exemplary embodiment of the invention centering on a control unit 20.

As illustrated in FIG. 4, the decoding apparatus 2 is made up of the control unit 20 including a CPU 202, memory 204, etc., a communication unit 22, a record unit 24 such as an HDD or a CD unit, and a user interface unit (UI unit) 26 including an LCD or a CRT display, a keyboard, a touch panel, etc.

The decoding apparatus 2 is, for example, a general-purpose computer in which a decoding program 5 (described later) is installed, and acquires code data through the communication unit 22, the record unit 24, etc., and decodes and outputs the acquired code data.

[Decoding Program]

Figure 5:
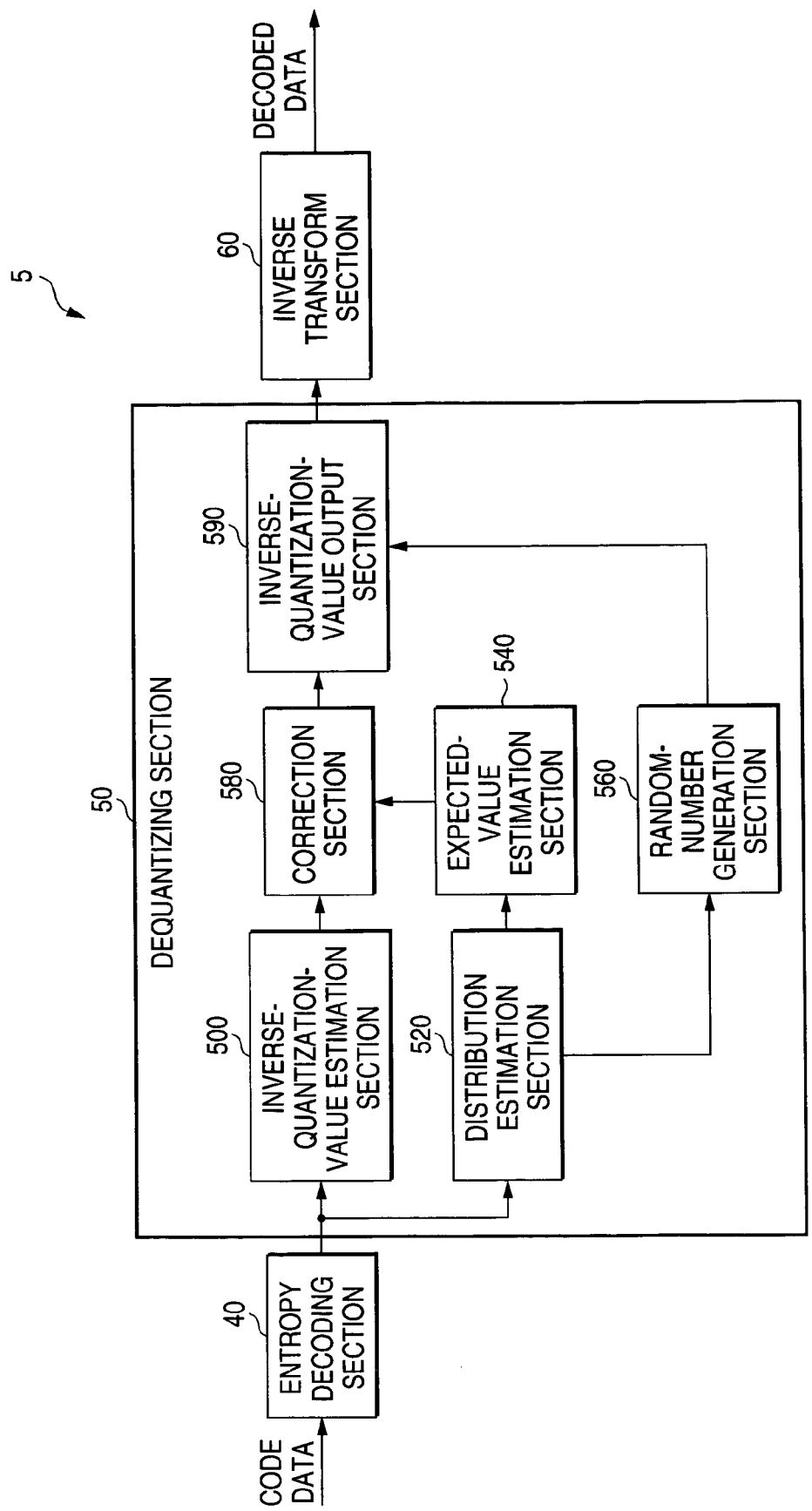
FIG. 5 is a block diagram to illustrate the functional configuration of a decoding program 5 executed by the control unit 20 (FIG. 4) for implementing the inverse quantization method according to the exemplary embodiment of the invention.

FIG. 5 is a block diagram to illustrate the functional configuration of a decoding program 5 executed by the control unit 20 (FIG. 4) for implementing the inverse quantization method according to the exemplary embodiment of the invention.

As illustrated in FIG. 5, the decoding program 5 has an entropy decoding section 40, an inverse quantization section 50, and an inverse transform section 60.

The inverse quantization section 50 includes an inverse-quantization-value estimation section 500, a distribution estimation section 520, an expected-value estimation section 540, a random-number generation section 560, a correction section 580, and an inverse-quantization-value output section 590.

In the decoding program 5, the entropy decoding section 40 entropy-decodes input code data and outputs the result to the inverse quantization section 50.

The entropy decoding section 40 of this example decodes the input code data, generates quantization indices Q, and outputs the generated quantization indices Q to the inverse quantization section 50.

The inverse quantization section 50 generates inverse quantization values based on the quantization indices Q input from the entropy decoding section 40, and outputs the generated inverse quantization values to the inverse transform section 60.

The inverse quantization section 50 of this example estimates distribution of transform coefficients for each code block of JPEG 2000 and generates the inverse quantization values corresponding to the quantization indices Q in accordance with the estimated distribution.

The inverse transform section 60 performs inverse transform processing (discrete wavelet inverse transform processing) based on the inverse quantization values input from the inverse quantization section 50 to generate a decoded image.

In the inverse quantization section 50, the inverse-quantization-value estimation section 500 estimates the inverse quantization values based on the quantization indices Q input from the entropy decoding section 40 and outputs the estimated inverse quantization values to the correction section 580. That is, the inverse-quantization-value estimation section 500 is able to generate a plurality of different inverse quantization values for a single quantization index rather than always generates a single inverse quantization value for a single quantization index. In other words, the inverse-quantization-value estimation section 500 generates a single inverse quantization value for each quantization index, but does not always generate the same inverse quantization value even if the input quantization index value is the same.

The inverse-quantization-value estimation section 500 in the example calculates based on the quantization index Q of a block in question and quantization indices of blocks in the surrounding of the block in question (limited to quantization indices having the same transform coefficient type c), a correction coefficient α of an inverse quantization value R corresponding to the quantization index Q of the block in question, and outputs the calculated correction coefficient α to the correction section 580.

In the description to follow, the correction coefficient α corresponding to each transform coefficient type c and each quantization index q is described as αycq. It is assumed that number of signals having the transform coefficient type c and each quantization index q is equal to K. Here, each correction coefficient can be represented as αycq(k) (where k=1, 2, ..., K).

The distribution estimation section 520 estimates distribution of transform coefficients (original data) based on the plurality of quantization indices Q input from the entropy decoding section 40 (or the inverse quantization values associated with the quantization indices Q) and outputs distribution data indicating the estimated distribution of the transform coefficients to the expected-value estimation section 540 and the random-number generation section 560.

The distribution estimation section 520 of this example calculates frequency distribution of the quantization index values for each transform coefficient type c, and generates the distribution data for each transform coefficient type c based on the calculated frequency distribution.

The expected-value estimation section 540 calculates expected values of the inverse quantization values based on the distribution data input from the distribution estimation section 520, and outputs the calculated expected values and the distribution data to the correction section 580.

More specifically, the expected-value estimation section 540 calculates an expected value of a probability density function of original data for each quantization section based on the distribution data generated for each transform coefficient type c.

It is assumed that in the case where the transform coefficient type is c and quantization index Q(c, i, j)=q, the expected value is represented as E(αTcq). That is, the expected value E(αTcq) is an estimated expected value of a difference between the inverse quantization value R, which is in a one-to-one correspondence with quantization index, and the original transform coefficient T corresponding to the quantization index Q.

The random-number generation section 560 generates a random number in accordance with the distribution data input from the distribution estimation section 520 and outputs the generated random number to the inverse-quantization-value output section 590.

The correction section 580 corrects the inverse quantization values input from the inverse-quantization-value estimation section 500 (in this example, the correction coefficients α of the inverse quantization values) in accordance with the distribution data and the expected value, which are input from the expected-value estimation section 540.

The correction section 580 corrects the inverse quantization values input from the inverse-quantization-value estimation section 500 (in this example, the correction coefficients α of the inverse quantization values) so as to fall within a predetermined range (for example, for the inverse quantization value, the quantization section corresponding to the quantization index), and outputs the corrected inverse quantization values (correction coefficients α) to the inverse-quantization-value output section 590.

The correction section 580 of this example corrects the correction coefficients α input from the inverse-quantization-value estimation section 500 so that the expected value input from the expected-value estimation section 540 and an average value of the correction coefficients α are substantially identical to each other in terms of each transform coefficient type c and in terms of each quantization section. Furthermore, the correction section 580 linearly corrects the corrected correction coefficients α so that the corrected correction coefficients α are in a range satisfying $0 \leq r+\alpha \leq 1$ when $Q(c, i, j) > 0$, a range satisfying $-1 \leq -r+\alpha \leq 0$ when $Q(c, i, j) < 0$, and a range satisfying $-1 \leq \alpha \leq 1$ when $Q(c, i, j) = 0$ in JPEG 2000.

The linear correction made by the correction section 580 is accomplished, for example, by selecting maximum value αmax and minimum value αmin from among the correction coefficients α corresponding to the same quantization index and linearly transforming the whole correction coefficients α so that the selected maximum value αmax and minimum value αmin fall within a predetermined range.

The inverse-quantization-value output section 590 determines the inverse quantization values to be applied, using the inverse quantization values input from the correction section 580 (in this example, the correction coefficients α of the inverse quantization values) or the random number input from the random-number generation section 560. Then, the inverse-quantization-value output section 590 outputs the determined inverse quantization values to the inverse transform section 60.

The inverse-quantization-value output section 590 of this example calculates the inverse quantization values based on the correction coefficients α input from the correction section 580 or the random-number generation section 560 and the quantization indices (or the inverse quantization values associate with the quantization indices). More specifically, the inverse-quantization-value output section 590 calculates the inverse quantization value Ry (c, i, j) to be applied according to the following expression:

$$Ry(c,i,j) = \{Q(c,i,j) + \alpha(c,i,j)\} \times D(c)$$

That is, the decoding program 5 of this example applies the random number generated by the random-number generation section 560 as the correction coefficients α of the inverse quantization values rather than applies the random number generated by the random-number generation section 560 as the inverse quantization values per se.

[Inverse-Quantization-Value Estimation Section]

Figure 6:
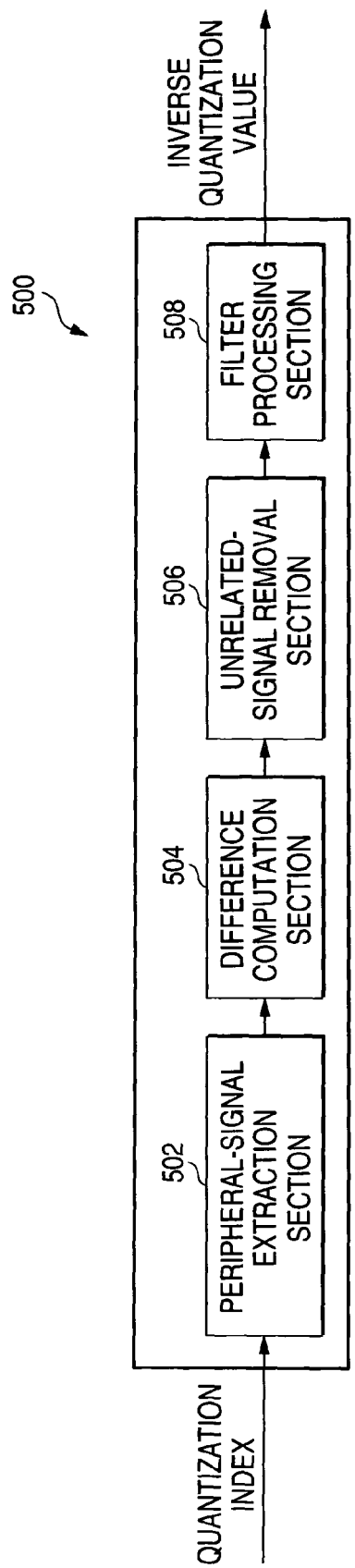
FIG. 6 is a block diagram to describe an inverse-quantization-value estimation section 500 (FIG. 5) in more detail.

FIG. 6 is a block diagram to describe the inverse-quantization-value estimation section 500 (FIG. 5) in more detail.

As illustrated in FIG. 6, the inverse-quantization-value estimation section 500 includes a peripheral-signal extraction section 502, a difference computation section 504, an unrelated-signal removal section 506, and a filter processing section 508.

The peripheral-signal extraction section 502 of the inverse-quantization-value estimation section 500 extracts surrounding quantization indices Q(c, i+m, j+n) of the quantization index Q(c, i, j) to be processed (where $-M \leq m \leq M$, $-N \leq n \leq N$). The surrounding quantization indices extracted here become a matrix of $(2M+1) \times (2N+1)$.

The difference computation section 504 calculates differences between inverse quantization values R (c, i+m, j+n) corresponding to the surrounding quantization indices Q (c, i+m, j+n) extracted by the peripheral-signal extraction section 502 and an inverse quantization value R (c, i, j) corresponding to the quantization index Q(c, i, j) to be processed. This is because in the case of the quantization intervals are different depending on the quantization indices, the difference between the inverse quantization values is more appropriate than that between the quantization indices.

The difference computation section 504 of this example generates a difference matrix of $(2M+1) \times (2N+1)$ made up of difference values P(m, n) by performing the following computation:

$$R(c,i,j) = (Q(c,i,j) + \alpha \times 2S(c,i,j)) \times D(c,i,j)$$

$$P(m,n) = \{R(c,i+m,j+n) - R(c,i,j)\}/D(c,i,j)$$

where S(c, i, j) is the number of truncated bits and D(c, i, j) is the quantization interval.

The unrelated-signal removal section 506 removes surrounding quantization indices Q(c, i+m, j+n) having small correlation with the quantization index Q(c, i, j) to be processed, using a predetermined threshold value H.

More specifically, if the difference calculated for each surrounding quantization index Q(c, i+m, j+n) by the difference computation section 504 is larger than the threshold value H, the unrelated-signal removal section 506 determines that the correlation is small, and removes the surrounding quantization index Q(c, i+m, j+n).

If ane absolute value of a difference value |P(m, n)| in the difference matrix generated by the difference computation section 504 is larger than the threshold value TH, the unrelated-signal removal section 506 of this example sets P (m, n)=0.

The threshold value TH is equal to, for example, 1.

The filter processing section 508 calculates the correction coefficient α of the quantization index Q(c, i, j) to be processed based on the surrounding quantization index Q (c, i+m, j+n) extracted by the peripheral-signal extraction section 502 (except the surrounding quantization index removed by the unrelated-signal removal section 506).

More specifically, the filter processing section 508 calculates the correction coefficient α based on the difference calculated by the difference computation section 504 (except the difference removed by the unrelated-signal removal section 506).

The filter processing section 508 of this example is provided with a filter kernel K (m, n) of $(2M+1) \times (2N+1)$. The filter kernel K may be a filter having a two-dimensional low-pass characteristic.

For example, considering the computation result when the threshold value TH is equal to 1 and the coefficient of the filter K (except the center) has a positive value, when the number of positive surrounding quantization indices is large, the α value takes a positive value. The larger the number of positive surrounding quantization indices is, the larger the α value is. Likewise, if the number of negative surrounding quantization indices is large, the α value becomes negative. If the number of positive surrounding quantization indices is equal to the number of negative surrounding quantization indices, the estimation value of the α value becomes 0. If the surrounding quantization index value is widely different from the quantization index in question, the value can be excluded from the values used for estimation of the α value.

[Distribution Estimation Section]

Figure 7:
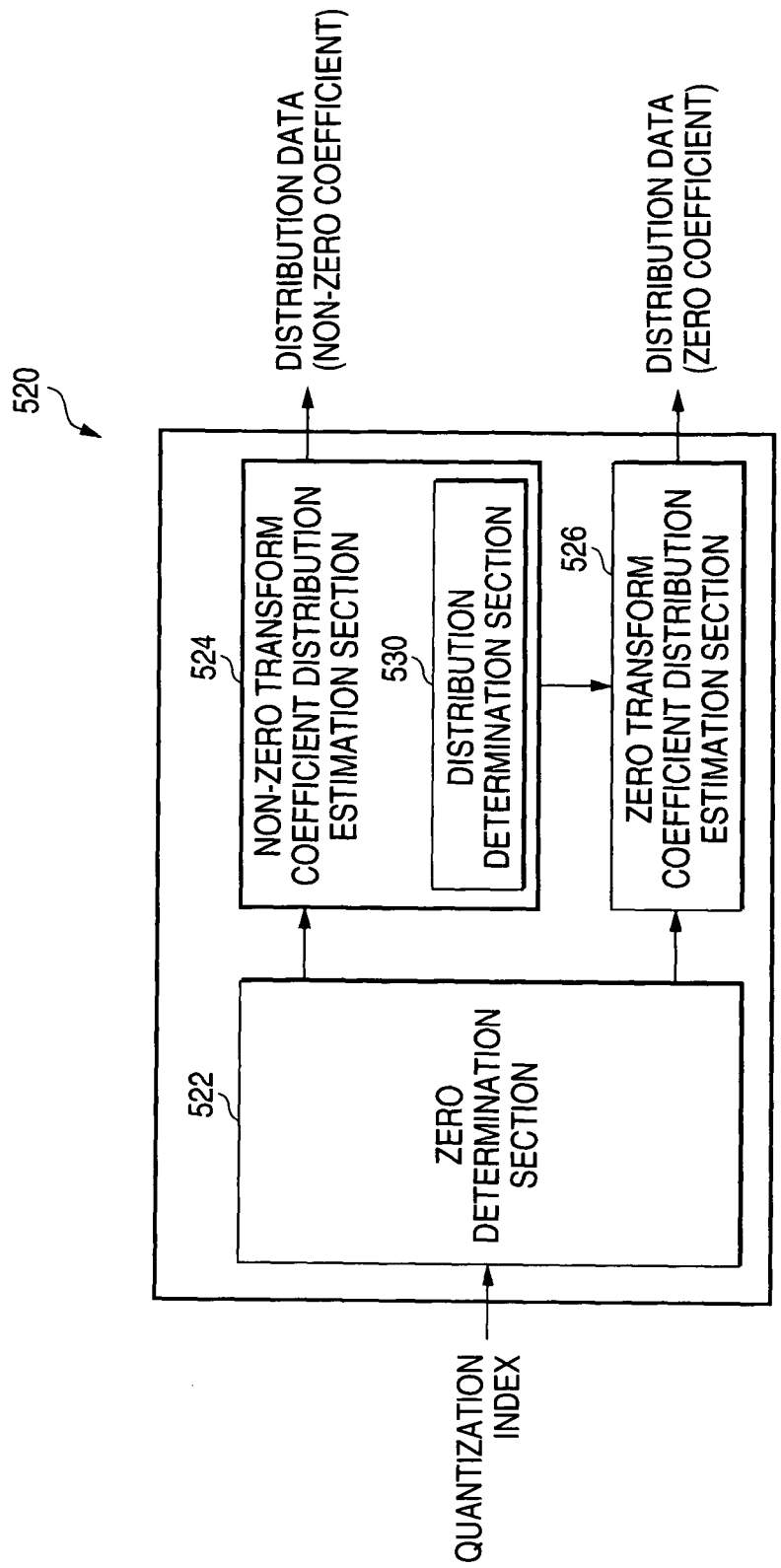
FIG. 7 is a block diagram to describe a distribution estimation section 520 (FIG. 5) in more detail.

FIG. 7 is a block diagram to describe the distribution estimation section 520 (FIG. 5) in more detail.

As illustrated in FIG. 7, the distribution estimation section 520 includes a zero determination section 522, a non-zero transform coefficient distribution estimation section 524, and a zero transform coefficient distribution estimation section 526. The non-zero transform coefficient distribution estimation section 524 includes a distribution determination section 530.

The zero determination section 522 of the distribution estimation section 520 classifies the quantization indices Q input from the entropy decoding section 40 into groups in accordance with attributes of original data corresponding to the quantization indices Q (for example, transform coefficient type). Then, the zero determination section 522 determines whether or not frequency distribution of the original data can be estimated based only on the group of the quantization indices falling into each attribute (in other words, whether or not it is necessary to estimate the frequency distribution of the original data using correlation with groups of quantization indices group falling into another attribute).

The distribution estimation section 520 of this example determines whether the quantization indices Q input from the entropy decoding section 40 correspond to a zero transform coefficient or a non-zero transform coefficient. Then, the distribution estimation section 520 outputs quantization indices, which are determined to correspond to a non-zero transform coefficient, to the non-zero transform coefficient distribution estimation section 524. With regard to quantization indices, which are determined to correspond to a zero transform coefficient, the distribution estimation section 520 instructs the zero transform coefficient distribution estimation section 526 to perform distribution estimation processing using the distribution of non-zero transform coefficients.

The non-zero transform coefficients are transform coefficients corresponding to quantization indices of a transform coefficient type c any of which is non-zero. The zero transform coefficients are transform coefficients corresponding to quantization indices of a transform coefficient type c all of which are zero. In other words, the transform coefficient, which is not a zero transform coefficient, is a non-zero transform coefficient.

The non-zero transform coefficient distribution estimation section 524 estimates the frequency distribution of the original data (in this example, transform coefficients) based on the quantization indices input from the zero determination section 522.

More specifically, the non-zero transform coefficient distribution estimation section 524 generates frequency distribution of the quantization indices having the same attribute (in this example, plural quantization indices corresponding to the same transform coefficient c) for each significant bit length (truncation position). Then, the non-zero transform coefficient distribution estimation section 524 generates a probability density function of the quantization indices based on the generated frequency distribution of the quantization indices. The probability density function is used as a function closely resembling a probability density function of the transform coefficients.

In this example, the distribution determination section 530 generates a histogram hc(q) of the quantization indices (the quantization indices corresponding to the non-zero transform coefficients) Q(c, i, j) input from the zero determination section 522 for each code block, each transform coefficient type c, and each truncation position.

For example, the distribution determination section 530 defines the following function ht(c, q, i, j):

if a value of the quantization index Q(c, i, j)=q, $ht(c,q,i,j)=1$, otherwise, ht(c, q, i, j)=0.

The distribution determination section 530 generates the histogram hc(q) according to the following expression:

$$hc(q) = \sum_i \sum_j ht(c, q, i, j) \qquad (1)$$

Next, the non-zero transform coefficient distribution estimation section 524 of this example approximates the histogram hc(q) generated by the distribution determination section 530 by a Laplace distribution, and adopts the Laplace function as a distribution function of the transform coefficients T.

The Laplace distribution expression can be represented as follows:

$$L(x) = \frac{1}{\sqrt{2}\,\sigma} \exp\left(\frac{-\sqrt{2}\,|x|}{\sigma}\right) \qquad (2)$$

The non-zero transform coefficient distribution estimation section 524 can obtain the distribution function of the transform coefficients T by calculating a in the expression (2).

First, the non-zero transform coefficient distribution estimation section 524 normalizes the generated histogram hc(q) in accordance to the quantization section width D(c) and total number of quantization indices, to transform the histogram hc(q) into a probability density function fhc(x). Specifically, the non-zero transform coefficient distribution estimation section 524 transforms the histogram hc (q) into the probability density function fhc(x) according to the following expression:

$$fhc(x) = \frac{hc(q)}{D(c) \times \sum_q hc(q)} \qquad (3)$$

where $(q-0.5) \times D(c) < x \leq (q+0.5) \times D(c)$

Next, the non-zero transform coefficient distribution estimation section 524 calculates the Laplace function to approximate the histogram hc(q).

If a quantization index is 0, the random-number generation section 560 generates random numbers of the Laplace distribution having the standard deviation σ as inverse quantization values.

The zero transform coefficient distribution estimation section 526 estimates frequency distribution of the zero transform coefficients based on the frequency distribution of other transform coefficients (e.g., non-zero transform coefficients) estimated by the non-zero transform coefficient distribution estimation section 524 in accordance with the instruction from the zero determination section 522.

That is, the non-zero transform coefficient distribution estimation section 524 can estimate a distribution only if the histogram has a significant shape. However, in the case where a histogram with all frequency values being 0 is generated, the non-zero transform coefficient distribution estimation section 524 cannot estimate the shape of a distribution.

Then, the zero transform coefficient distribution estimation section 526 uses any other distribution data already found (in this example, σ values) to estimate the shape of the Laplace distribution when all quantization indices of transform coefficient type c are 0.

Specifically, the zero transform coefficient distribution estimation section 526 approximates the standard deviation σ(x, y) calculated by the non-zero transform coefficient distribution estimation section 524 by a two-dimensional exponential function. That is, σ(x, y)=Cexp(−ax−by).

The zero transform coefficient distribution estimation section 526 calculates the parameters C, a, and b of σ(x, y)=Cexp(−ax−by) to determine an approximate function σ(x, y). Then, the zero transform coefficient distribution estimation section 526 uses the determined approximate function σ(x, y) to calculate the σ values corresponding to the zero transform coefficients.

Figure 8:
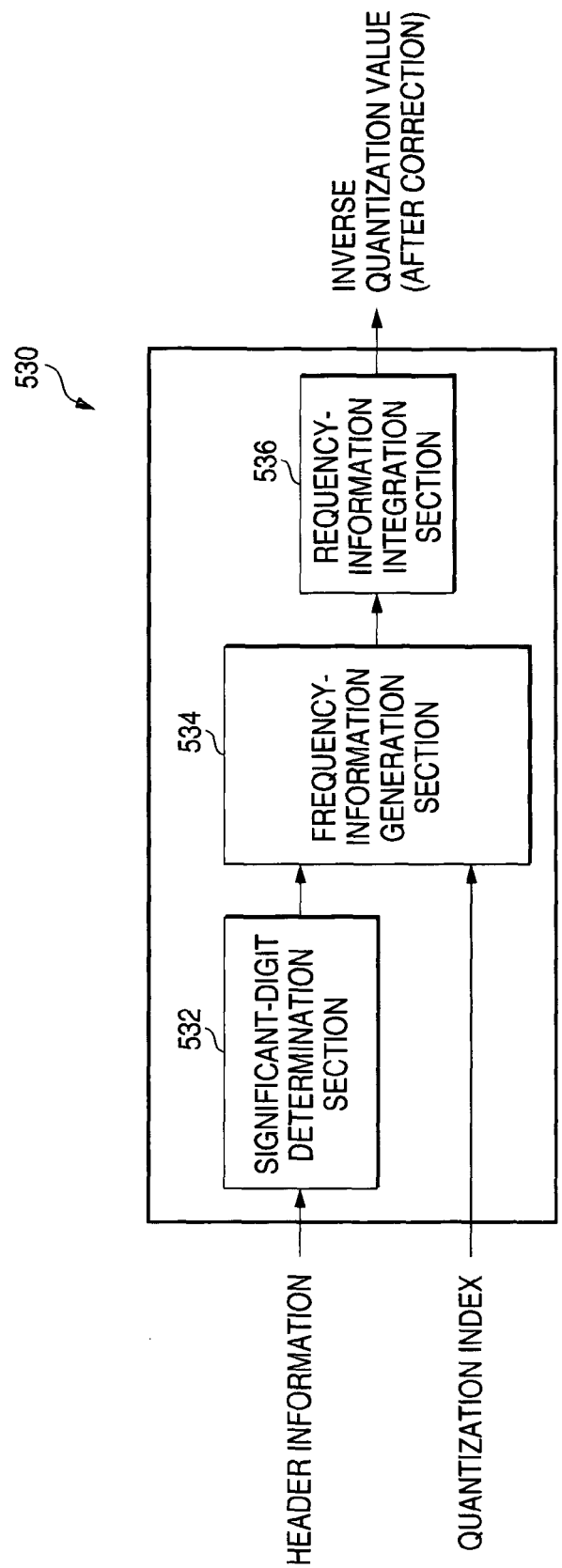
FIG. 8 is a block diagram to describe a distribution determination section 530 (FIG. 7) in more detail.

FIG. 8 is a block diagram to describe the distribution determination section 530 (FIG. 7) in more detail.

As illustrated in FIG. 8, the distribution determination section 530 includes a significant-digit determination section 532, a frequency-information generation section 534, and a frequency-information integration section 536.

The significant-digit determination section 532 of the distribution determination section 530 determines the significant bit length of a bit string indicating a quantization index. Then, the significant-digit determination section 532 classifies the input quantization index based on the determined significant bit length.

In this example, the quantization index is input for each code block. Therefore, the significant-digit determination section 532 determines which of the two kinds of significant bit lengths (truncation positions) the quantization index corresponds to, and classifies the quantization index contained in the code block into a group in which quantization indices have the number of truncated bits $S_1$ or a group in which quantization indices have the number of truncated bits $S_2$, based on the determination result.

The frequency-information generation section 534 generates frequency distribution information of the quantization index values for each group, based on the quantization indices classified by the significant-digit determination section 532.

The frequency-information generation section 534 of this example generates a histogram (frequency distribution information) for the group in which the quantization indices have the number of truncated bits $S_1$ and a histogram (frequency distribution information) for the group in which the quantization indices have the number of truncated bits $S_2$.

The frequency-information integration section 536 integrates the plural pieces of frequency distribution information generated by the frequency-information generation section 534.

The frequency-information integration section 536 of this example integrates the histogram for the group in which the quantization indices have the number of truncated bits $S_1$ and the histogram for the group in which the quantization indices have the number of truncated bits $S_2$, using the narrowest quantization interval. In the following description, the case where $S_1$ is smaller than $S_2$ (namely, the quantization interval of the group of $S_1$ is narrower than that of the group of $S_2$) is taken as a specific example.

FIG. 9 is a drawing to illustrate a histogram integration method performed by the frequency-information integration section 536.

Figure 9A:
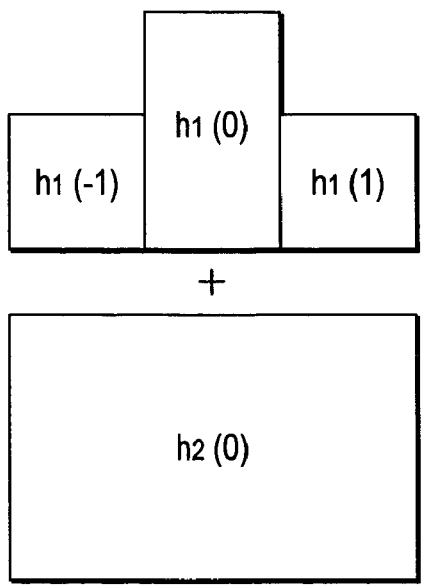
FIG. 9 is a drawing to illustrate a histogram integration method performed by a frequency-information integration section 536.

As illustrated in FIG. 9A, if the histogram $h_1$ for the group in which the quantization indices have the number of truncated bits $S_1$ has a narrower quantization interval than the histogram $h_2$ for the group in which the quantization indices have the number of truncated bits $S_2$, the frequency-information integration section 536 divides a frequency value $h_2$ for the $S_2$ group having the wider quantization interval and distributes values to the histogram $h_1$ for the $S_1$ group having the narrowest quantization interval. Hereinafter, the frequency values thus distributed will be referred to as "distribution values".

Figure 9B:
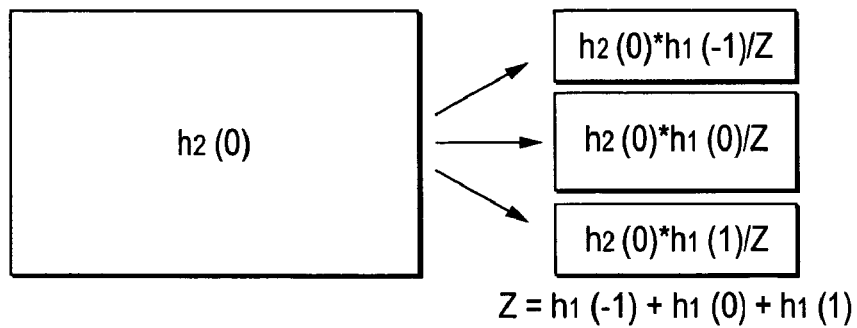

The frequency-information integration section 536 of this example divides the frequency value $h_2$ for the $S_2$ group so as to be proportional to a frequency value in a quantization section to which the frequency values are distributed (in this example, a frequency value in each quantization section for $S_1$) to determine each distribution value, as illustrated in FIG. 9B.

If the frequency values in the quantization section to which the frequency values are distributed are all zero, the frequency-information integration section 536 divides the frequency value $h_2$ in the distribution source ($S_2$) so as to become proportional to the width of the quantization section to which the frequency values are distributed (quantization intervals) to calculate each distribution value.

Figure 9C:
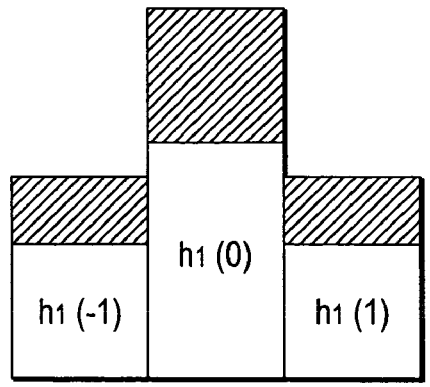

The frequency-information integration section 536 adds the distribution values to the histogram $h_1$ to which the frequency values are distributed to generate an integrated histogram h, as illustrated in FIG. 9C.

[Correction Section]

Figure 10:
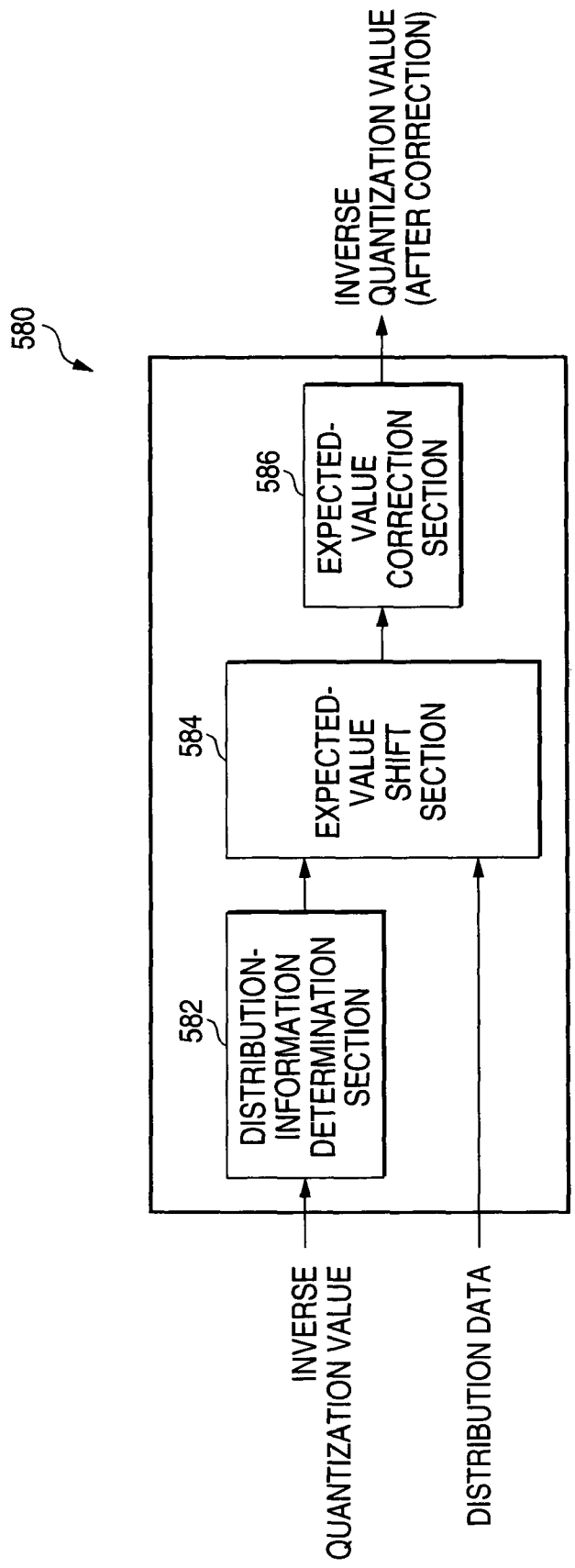
FIG. 10 is a block diagram to describe a correction section 580 (FIG. 5) in more detail.

FIG. 10 is a block diagram to describe the correction section 580 (FIG. 5) in more detail.

As illustrated in FIG. 10, the correction section 580 includes a distribution-information determination section 582, an expected-value shift section 584, and an expected-value correction section 586.

The distribution-information determination section 582 of the correction section 580 calculates the average value, the minimum value, and the maximum value of the inverse quantization values input from the inverse-quantization-value estimation section 500 (in this example, correction coefficients α) for each transform coefficient type and for each quantization index value. Then, the distribution-information determination section 582 outputs the calculated average value, minimum value, and maximum value to the expected-value shift section 584 together with the input inverse quantization values.

Hereinafter, the average value, the minimum value, and the maximum value calculated by the distribution-information determination section 582 will be represented as an average value αycqMean, a minimum value αycqMin, and a maximum value αycqMax. The values are calculated for each combination of a transform coefficient type c and a quantization index value q. Processings executed by the expected-value shift section 584 and the expected-value correction section 586 (described below) are also performed for each combination of a transform coefficient type c and a quantization index value q.

The expected-value shift section 584 uses the correction coefficients αycq(k) and the correction-coefficient average value αycqMean, which are input from the distribution-information determination section 582, and the expected value E(αTcq) input from the expected-value estimation section 540 to perform the following computation for calculating correction coefficient αxcq1(k) after shift correction:

$$\alpha xcq1(k) = \alpha ycq(k) + E(\alpha Tcq) - \alpha ycq\text{Mean}$$

The above-described processing is performed for k=1, 2, ..., K.

The expected-value shift section 584 also shifts the maximum value and the minimum value in a similar manner.

That is, the expected-value shift section 584 performs the following computation to calculate minimum value $\alpha ycqMin1$ and maximum value $\alpha ycqmax1$ after shift correction:

$$\alpha ycqMin1 = \alpha xcqMin + E(\alpha Tcq) - \alpha ycqMean$$

$$\alpha ycqMax1 = \alpha xcqMax + E(\alpha Tcq) - \alpha ycqMean$$

The expected-value correction section 586 makes a range correction so that all correction coefficients $\alpha xcq1(k)$ after the shift correction fall within a predetermined range. The range correction means a correction, which causes numeric values to fall within a given range.

Specifically, the expected-value correction section 586 places the correction coefficients $\alpha xcq1$ after the shift correction in a given range ($\alpha$min to $\alpha$max) without changing the average value of the correction coefficients $\alpha xcq1$.

The expected-value correction section 586 obtains correction coefficient $\alpha xcq2(k)$ after the range correction by executing the range correction described above.

Figure 11:
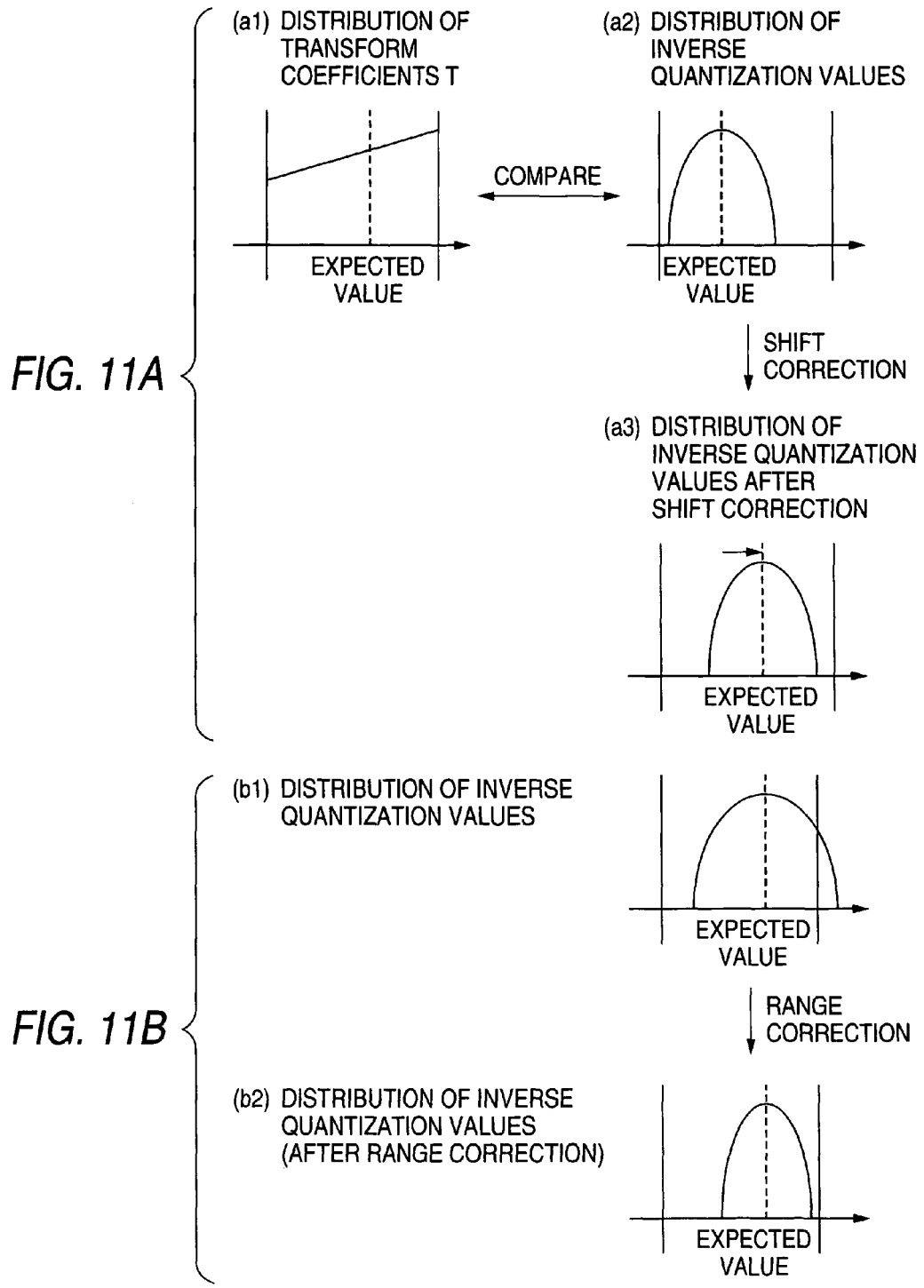
FIG. 11 is a drawing to schematically describe correction made by an expected-value shift section 584 and an expected-value correction section 586.

FIG. 11 is a drawing to schematically describe the corrections of the expected-value shift section 584 and the expected-value correction section 586.

As shown in FIG. 11A, the expected-value shift section 584 shifts the distribution of the inverse quantization values (a3) so that the estimated expected values of transform coefficient T (a1) and the expected values of inverse quantization values (a2) match each other.

As shown in FIG. 11B, if the distribution of the inverse quantization values (in the example, correction coefficients $\alpha$) is outside the quantization sections d1 to d2 (in the example, $\alpha$ range $\alpha$min to $\alpha$max) (b1), the expected-value correction section 586 lessens the distribution toward the expected values (b2) without moving the expected values of the inverse quantization values (correction coefficients $\alpha$) (b2).

In this example, the expected-value shift section 584 and the expected-value correction section 586 perform correction processing independently. However, the correction processing executed by the expected-value shift section 584 and the correction processing of the expected-value correction section 586 may be integrated into one.

[Overall Operation]

Next, the overall operation of the decoding apparatus 2 (decoding program 5) will be discussed.

Figure 12:
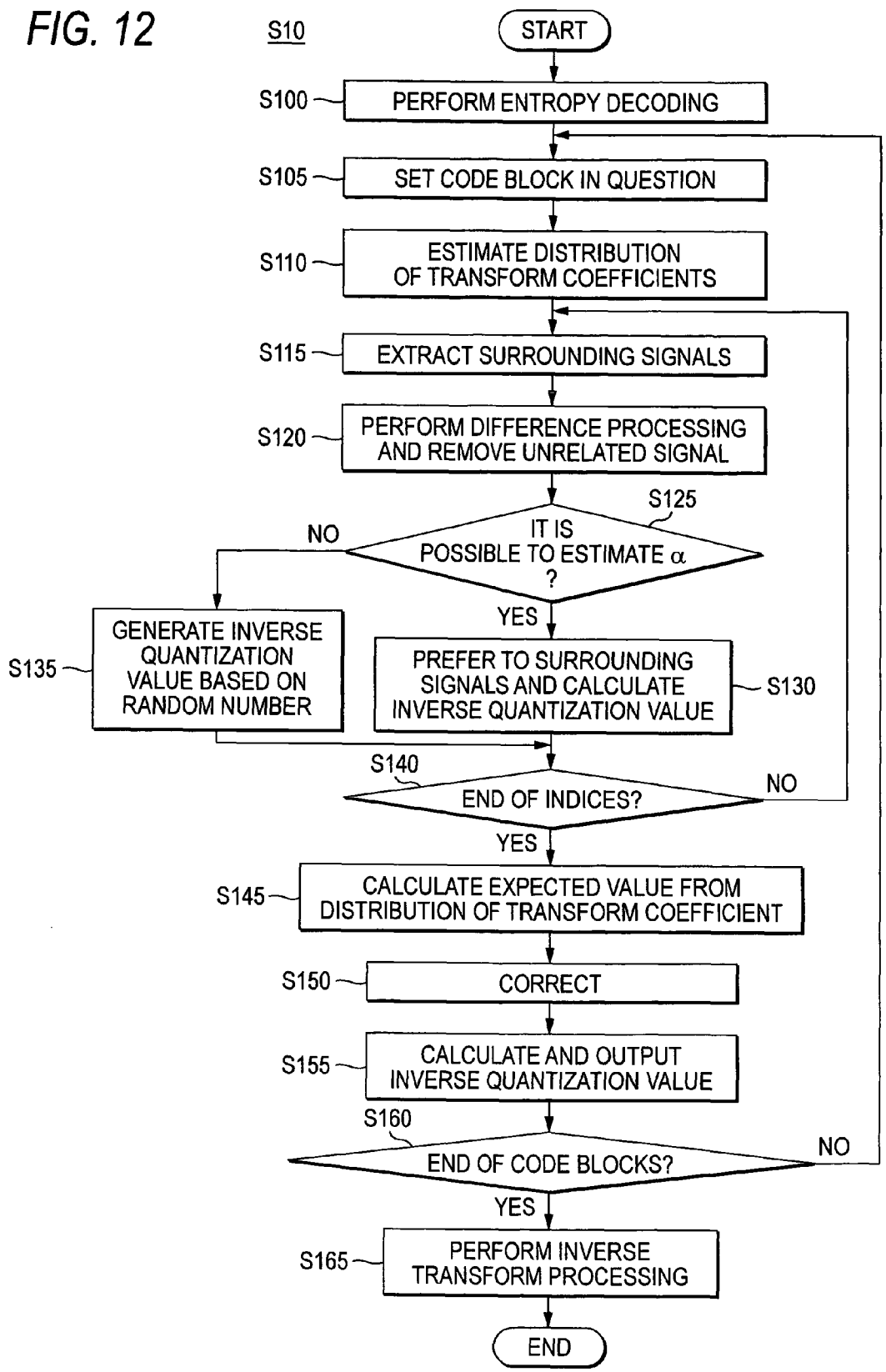
FIG. 12 is a flowchart of decoding processing (S10) executed by the decoding program 5 (FIG. 5)

FIG. 12 is a flowchart of decoding processing (S10) executed by the decoding program 5 (FIG. 5). Here, the case where code data of image data (JPEG 2000) is input will be discussed as a specific example.

As shown in FIG. 12, at step 100 (S100), the entropy decoding section 40 (FIG. 5) decodes input code data, generates quantization indices, and outputs the generated quantization indices in each block to the inverse quantization section 50.

At step 105 (S105), the inverse quantization section 50 divides the quantization indices input from the entropy decoding section 40 for each code block and sets a code block in question to be processed.

The inverse quantization section 50 executes steps S110 to S155 for the setup code block in question.

At step 110 (S110), the distribution estimation section 520 estimates a distribution of transform coefficients T for each transform coefficient type c and for each truncated bit position based on the quantization indices contained in the code block in question.

Specifically, the significant-digit determination section 532 classifies the quantization indices contained in the code block in question into quantization indices having the number of truncated bits $S_1$ and quantization indices having the number of truncated bits $S_2$.

The frequency-information generation section 534 generates a histogram for the quantization indices having the number of truncated bits $S_1$ and a histogram for the quantization indices having the number of truncated bits $S_2$.

The frequency-information integration section 536 integrates the two kinds of generated histograms into one histogram h as illustrated in FIG. 9.

The non-zero transform coefficient distribution estimation section 524 calculates the Laplace function L (namely, $\sigma$ value) to approximate the histogram h generated by the distribution estimation section 520.

The zero transform coefficient distribution estimation section 526 approximates the frequency distribution, which is generated by the non-zero transform coefficient distribution estimation section 524, by an exponential function. Then, the zero transform coefficient distribution estimation section 526 estimates the frequency distribution of zero transform coefficients (namely, $\sigma$ values) using the exponential function.

At step 115 (S115), the inverse quantization section 50 (FIG. 5) sets the quantization indices contained in the code block in question to a quantization index in question sequentially.

The inverse-quantization-value estimation section 500 (FIG. 5) extracts surrounding quantization index Q(c, i+m, j+n) of the quantization index in question Q(c, i, j) (in this example, $-1 \leq m \leq 1$, $-1 \leq n \leq 1$). The extracted surrounding quantization indices Q(c, i+m, j+n) are quantization index values corresponding to the same transform coefficient type c in 3×3 blocks centering on the block in question and become a matrix of 3×3.

At step 120 (S120), the inverse-quantization-value estimation section 500 generates a difference matrix P using the extracted surrounding quantization indices and the quantization index in question.

Next, the inverse-quantization-value estimation section 500 makes a comparison between the absolute value |P(m, n)| of each difference value contained in the difference matrix P and a threshold value TH (for example, 1) and sets the difference value P (m, n) larger than the threshold value TH to 0 (threshold processing). That is, the inverse-quantization-value estimation section 500 removes the surrounding quantization index value with the difference from the quantization index in question value being larger than the threshold value as an unrelated signal.

At step 125 (S125), the inverse quantization section 50 (FIG. 5) determines whether or not estimation of inverse quantization value is possible about the quantization index in question.

Specifically, if the attention quantization indices and all elements of the difference matrix P subjected to the threshold processing are 0 (for example, if all difference values P are removed as unrelated signals, etc.), the inverse quantization section 50 determines that estimation of inverse quantization value is impossible; otherwise, the inverse quantization section 50 determines that estimation of inverse quantization value is possible.

If it is determined that estimation of inverse quantization value (in the example, estimation of correction coefficient $\alpha$) is possible, the inverse quantization section 50 goes to S130; if it is determined that estimation is impossible, the inverse quantization section 50 goes to S135.

At step 130 (S130), the inverse-quantization-value estimation section 500 performs convolution computation for the difference matrix P subjected to the threshold processing using 3×3 filter kernel K (m, n) having a low-pass characteristic. Therefore, even if the quantization index in question values are the same, if the surrounding quantization indices differ, calculated correction coefficients $\alpha ycq$ take different values.

At step 135 (S135), the random-number generation section 560 generates a random number responsive to the distribution data input from the distribution estimation section 520 for the quantization index in question and outputs the generated random number to the inverse-quantization-value output section 590 as the correction coefficient α.

Specifically, the random-number generation section 560 selects the distribution corresponding to the quantization index in question from the distributions estimated by the non-zero transform coefficient distribution estimation section 524 and the zero transform coefficient distribution estimation section 526, generates a random number matching the selected distribution, and outputs the random number to the inverse-quantization-value output section 590 as the correction coefficient α.

At step 140 (S140), the inverse quantization section 50 determines whether or not the correction coefficients α have been generated for all quantization indices contained in the code block in question. If the correction coefficients α have been generated for all quantization indices, the inverse quantization section 50 goes to S145; otherwise, the inverse quantization section 50 returns to S115 and processes another quantization index as the quantization index in question.

At step 145 (S145), the expected-value estimation section 540 calculates the expected value E(αTcq) of a probability density function for each combination of the transform coefficient type and the quantization index based on the distribution data input from the distribution estimation section 520, and outputs the calculated expected value E(αTcq) to the correction section 580.

At step 150 (S150), the correction section 580 classifies the correction coefficients α calculated by the inverse-quantization-value estimation section 500 for each transform coefficient type and for each quantization index, and calculates the minimum value, the maximum value, and the average value of the classified correction coefficients α.

Next, the correction section 580 makes a comparison between the expected value E(αTcq) input from the expected-value estimation section 540 and the calculated average value for each combination of the transform coefficient type and the quantization index, and shifts the correction coefficient αycq group classified according to the combination of the transform coefficient type and the quantization index so that the expected value and the average value match (shift correction).

Further, the correction section 580 determines whether or not the correction coefficient αycq group subjected to the shift correction falls within a default range. If the correction coefficient αycq group does not fall within the default range, the correction section 580 makes a range correction for placing the correction coefficient αycq group range in the default range without changing the average value of the correction coefficient αycq group.

At step 155 (S155), the inverse-quantization-value output section 590 (FIG. 5) calculates the inverse quantization value Ry to be applied based on the quantization index in question Q and the correction coefficient α input from the correction section 580 or the correction coefficient α input from the random-number generation section 560, and outputs the calculated inverse quantization value Ry to the inverse transform section 60.

Specifically, the inverse-quantization-value output section 590 in the example calculates the inverse quantization value Ry by performing the following computation:

$$Ry(c,i,j) = \{(Q(c,i,j) + \alpha(c,i,j)\} \times D(c)$$

At step 160 (S160), the inverse quantization section 50 determines whether or not the inverse quantization values have been calculated for all code blocks contained in code data. If the inverse quantization values have been calculated for all code blocks, the inverse quantization section 50 goes to S165; otherwise, the inverse quantization section 50 returns to S105 and sets another code block to the code block in question.

At step 165 (S165), the inverse transform section 60 (FIG. 5) performs inverse transform processing (in the example, inverse wavelet transform) using the inverse quantization values (approximate transform coefficients) input from the inverse quantization section 50 and generates a decoded image H.

As described above, the decoding apparatus 2 in the exemplary embodiment estimates a transform coefficient distribution based on the quantization indices, generates random numbers matching the estimated distribution, and generates the inverse quantization values based on the random numbers.

Accordingly, the frequency distribution of the inverse quantization values becomes closer to the frequency distribution of the transform coefficients, so that a decoded image having higher reproducibility can be expected.

First Modified Example

In the exemplary embodiment described above, the case where boundary between the quantization sections at wider quantization intervals matches that between the quantization sections at narrower quantization intervals is described. However, they may mismatch as illustrated in FIG. 13A.

Then, in this first modified example, a frequency-value distributing method used when the quantization section boundaries do not match will be discussed.

Figures 13A, 13B:
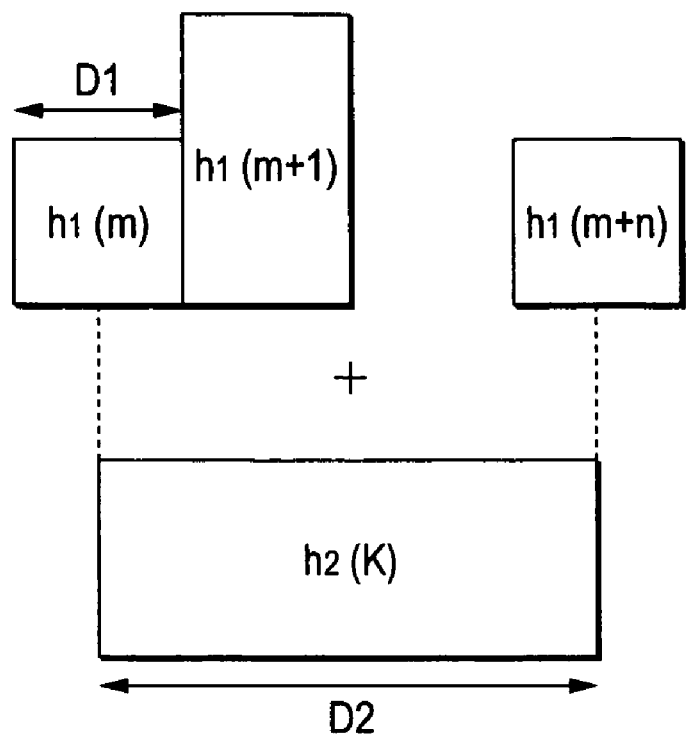
FIG. 13 is a drawing to describe a frequency-value distributing method when quantization section boundaries do not match.

If the quantization section boundaries do not match as illustrated in FIG. 13A, the frequency-information integration section 536 of this modified example distributes frequency values (histogram $h_2$) in accordance with the quantization section overlap degree.

Specifically, the frequency-information integration section 536 generates an integrated histogram in the overlap region (in the figure, D2) according to an expression illustrated in FIG. 13B and a quantization section overlap ratio r (for example, r(m)=(overlap section length between quantization sections D1 and D2)/(section length of quantization section D1), r(m+1)=1).

Second Modified Example

In the exemplary embodiment described above, a histogram is generated for each significant bit length (truncation position) of quantization index and the histograms are integrated. However, the invention is not limited to the exemplary embodiment. A frequency-information integration section 536 (distribution-information selection section) of the second modified example selects and applies the histogram corresponding to the significant bit length of the quantization index to be processed from among histograms (frequency distribution information) generated for each significant bit length (truncation position) of quantization index.

Third Modified Example

In the exemplary embodiment described above, since the inverse quantization values differ depending on the quantization interval, the inverse-quantization-value estimation section 500 calculates the inverse quantization values corresponding to the surrounding quantization indices and then uses the calculated surrounding inverse quantization values to calculate the inverse quantization value corresponding to the quantization index in question. Thus, the computation load increases.

Then, the inverse-quantization-value estimation section 500 of this third modified example makes the quantization intervals uniform (be the widest quantization interval) and uses the surrounding quantization indices to calculate the inverse quantization value (or correction coefficient α) corresponding to the quantization index in question.

Specifically, the inverse-quantization-value estimation section 500 shifts all quantization indices contained in a code block to the right as many bits as the maximum number of bits of the truncated numbers of bits and unifies the quantization intervals corresponding to the quantization indices contained in the code block.

Next, the inverse-quantization-value estimation section 500 creates a difference matrix of $(2M+1) \times (2N+1)$ made up of difference values P (m, n) by performing the following computation:

$$P(m,n)=Q(c,i+m,j+n)-Q(c,i,j)$$

The inverse-quantization-value estimation section 500 removes unrelated signals by the unrelated-signal removal section 506, and then uses a filter kernel k to calculate the correction coefficient α of the quantization index in question Q(c, i, j).

Thus, in the third modified example, the inverse quantization values corresponding to the surrounding quantization indices need not be calculated, so that high-speed processing is made possible.

Other Modified Examples

In the exemplary embodiment described above, since inverse quantization processing is performed independently for each code block, the number of the kinds of number of significant bits of quantization index is at most two. However, when three or more kinds of number of significant bits exist, histograms can also be integrated in a similar manner. Also in this case, any quantization interval is used as the reference and the frequency values of another histogram are distributed to the histogram as the reference, whereby the histograms are integrated as in the exemplary embodiment described above.

In the exemplary embodiment described above, if different types of number of significant bits exist, the histogram with the narrowest quantization interval is used as the reference, but the histogram with the widest quantization interval may be used as the reference. In this case, the quantization index is shifted to the right as many bits as the maximum number of truncated bits, whereby the quantization intervals can be unified, so that integration of the histograms is facilitated.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A decoding apparatus for decoding input code data, the decoding apparatus comprising:
   an entropy decoding section that decodes the input code data and generates quantization indices;
   an inverse quantization-value estimating section that estimates inverse quantization values based on the quantization indices;
   a distribution estimation section, that outputs distribution data, comprising:
      (a) a significant-digit determination section that determines a significant bit lengths of a bit string indicating a quantization index and classifies, into a plurality of groups, the quantization indices based on the significant bit lengths;
      (b) a frequency-information generation section that generates histograms of the quantization indices classified by the significant-digit determination section for each group, each group having quantization indices with the same number of truncated bits; and
      (c) a frequency-information integration section that integrates the histograms generated for each group having quantization indices with the same number of truncated bits to generate a single histogram by dividing a wider quantization interval of a first group of the plurality of groups of the quantization indices by the narrowest quantization interval of a second group other group of the plurality of groups of quantization indices;
   an expected-value estimating section that calculates expected values based on the distributed data from the distribution estimation section;
   a random-number generating section that generates a random number in accordance with the distribution data from the distribution estimation section;
   a correction section that corrects the inverse quantization values from the inverse-quantization-value estimation section in accordance with expected values from the expected-value estimating section;
   an inverse-quantization-value output section that determines inverse quantization values to be applied using the inverse quantization values from the correction section or the random number from the random-number generating section; and
   an inverse transform section that generates a decoded image of the input code data based on the inverse quantization values from the inverse-quantization-value output section.

2. The apparatus according to claim 1, wherein:
   the input code data is data coded in JPEG 2000, and
   the significant-digit determination section classifies the quantization indices contained in the code data for each code block.

3. A decoding method comprising:
   decoding, by an entropy decoding section, input code data and generating quantization indices;
   estimating, by an inverse quantization-value estimating section, inverse quantization values based on the quantization indices;
   outputting distribution data, by a distribution estimation section, wherein the outputting the distribution data includes:
      (a) determining, by a significant-digit determination section, a significant bit lengths of a bit string indicating a quantization index and classifying, into a plurality of groups, the quantization indices based on the significant bit lengths;
      (b) generating, by a frequency-information generating section, histograms of the quantization indices classified by the significant-digit determination section, for each group, each group having quantization indices with the same number of truncated bits; and
      (c) integrating, by a frequency-information integration section, the histograms generated for each group having quantization indices with the same number of truncated bits to generate a single histogram by dividing a wider quantization interval of a first group of the plurality of groups of the quantization indices by the narrowest quantization interval of a second group other group of the plurality of groups of quantization indices;
   calculating, by an expected-value estimating section, expected values based on the distributed data from the distribution estimation section;

generating, a random-number generating section, a random number in accordance with the distribution data from the distribution estimation section;

correcting, by a correction section, the inverse quantization values from the inverse-quantization-value estimation section in accordance with expected values from the expected-value estimating section;

determining, by an inverse-quantization-value output section, inverse quantization values to be applied using the inverse quantization values from the correction section or the random number from the random-number generating section; and generating, by an inverse transform section, a decoded image of the input code data based on the inverse quantization values from the inverse-quantization-value output section, wherein the above steps are performed by a processor.

4. A non-transitory computer readable medium storing a program causing a computer to execute a process for decoding input code data, the processing comprising:

decoding, by an entropy decoding section, the input code data and generating quantization indices;

estimating, by an inverse quantization-value estimating section, inverse quantization values based on the quantization indices;

outputting distribution data, by a distribution estimation section, wherein the outputting the distribution data includes:

(a) determining, by a significant-digit determination section, a significant bit lengths of a bit string indicating a quantization index and classifying, into a plurality of groups, the quantization indices based on the significant bit lengths;

(b) generating, by a frequency-information generating section, histograms of the quantization indices classified by the significant-digit determination section, for each group, each group having quantization indices with the same number of truncated bits; and (c) integrating, by a frequency-information integration section, the histograms generated for each group having quantization indices with the same number of truncated bits to generate a single histogram by dividing a wider quantization interval of a first group of the plurality of groups of the quantization indices by the narrowest quantization interval of a second group other group of the plurality of groups of quantization indices;

calculating, by an expected-value estimating section, expected values based on the distributed data from the distribution estimation section;

generating, a random-number generating section, a random number in accordance with the distribution data from the distribution estimation section;

correcting, by a correction section, the inverse quantization values from the inverse-quantization-value estimation section in accordance with expected values from the expected-value estimating section;

determining, by an inverse-quantization-value output section, inverse quantization values to be applied using the inverse quantization values from the correction section or the random number from the random-number generating section; and generating, by an inverse transform section, a decoded image of the input code data based on the inverse quantization values from the inverse-quantization-value output section.

* * * * *